(12) United States Patent
Beyer et al.

(10) Patent No.: US 8,474,251 B2
(45) Date of Patent: Jul. 2, 2013

(54) CYLINDER HEAD COOLING SYSTEM

(75) Inventors: Ted Beyer, Canton, MI (US); Jody Michael Slike, Farmington Hills, MI (US); John Christopher Riegger, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 324 days.

(21) Appl. No.: 12/907,264

(22) Filed: Oct. 19, 2010

(65) Prior Publication Data
US 2012/0090565 A1  Apr. 19, 2012

(51) Int. Cl.
*F01N 3/02* (2006.01)

(52) U.S. Cl.
USPC ............ 60/321; 60/280; 60/298; 60/320; 60/323; 123/41.72; 123/41.82 A; 123/41.82 R; 123/41.84

(58) Field of Classification Search
USPC . 60/272, 280, 298, 320, 321, 323; 123/41.72, 123/41.79, 41.82 A, 41.82 R, 41.84
See application file for complete search history.

(56) References Cited

U.S. PATENT DOCUMENTS

| | | | |
|---|---|---|---|
| 2,691,460 A | 10/1954 | Barnebey | |
| 3,201,934 A | 8/1965 | Smith | |
| 3,341,974 A | 9/1967 | Ganzinotii | |
| 4,095,804 A | 6/1978 | Elmgren et al. | |
| 4,211,205 A | 7/1980 | Lockhart | |
| 4,267,977 A | 5/1981 | Stockner et al. | |
| 4,683,844 A | 8/1987 | Arai et al. | |
| 4,866,934 A | 9/1989 | Lindstedt | |
| 4,944,265 A | 7/1990 | Davey | |
| 5,125,551 A | 6/1992 | Slee | |
| 5,267,740 A | 12/1993 | Stritzke | |
| 5,370,309 A | 12/1994 | Strelbisky et al. | |
| 5,853,175 A | 12/1998 | Udagawa | |
| 5,860,394 A | 1/1999 | Saito et al. | |
| 5,873,330 A * | 2/1999 | Takahashi et al. | 123/41.31 |
| 6,588,766 B2 | 7/2003 | Shattuck | |
| 6,786,490 B2 | 9/2004 | Fujino et al. | |
| 6,901,891 B2 | 6/2005 | Suzuki et al. | |
| 6,976,683 B2 | 12/2005 | Eckert et al. | |
| 7,044,099 B2 | 5/2006 | Gorgas et al. | |
| 7,073,491 B2 * | 7/2006 | Yi | 123/568.12 |
| 7,152,571 B1 | 12/2006 | Wilson et al. | |
| 7,249,578 B2 | 7/2007 | Fricke et al. | |
| 7,287,373 B2 | 10/2007 | Matsuda | |

(Continued)

FOREIGN PATENT DOCUMENTS

| | | |
|---|---|---|
| EP | 2050990 A1 | 4/2009 |
| GB | 720916 | 12/1954 |
| KR | 1020090044729 A | 5/2009 |
| WO | 2007096032 A1 | 8/2007 |

OTHER PUBLICATIONS

Beyer, Ted, "Fuel Injector Cooling," U.S. Appl. No. 12/850,384, filed Aug. 4, 2010, 30 pages.

*Primary Examiner* — Binh Q Tran
(74) *Attorney, Agent, or Firm* — Julia Voutyras; Alleman Hall McCoy Russell & Tuttle LLP

(57) ABSTRACT

A cylinder head with an integrated exhaust manifold is provided, the integrated exhaust manifold including an exhaust manifold flange. In one example, the cylinder head includes a cooled flange to control exhaust system heat. The cylinder head can improve operation of an integrated cylinder head during at least some operating conditions.

19 Claims, 12 Drawing Sheets

U.S. PATENT DOCUMENTS

| | | |
|---|---|---|
| 7,367,294 B2 | 5/2008 | Rozario et al. |
| 7,784,442 B2 * | 8/2010 | Lester et al. ............... 123/193.5 |
| 7,954,314 B1 * | 6/2011 | Bruestle et al. ................ 60/313 |
| 8,146,543 B2 * | 4/2012 | Kuhlbach et al. ...... 123/41.82 R |
| 8,146,544 B2 * | 4/2012 | Lopez-Crevillen et al. ..................... 123/41.82 R |
| 2002/0024183 A1 | 2/2002 | Thompson |
| 2006/0124765 A1 | 6/2006 | Kothen et al. |
| 2007/0180820 A1 | 8/2007 | Kenyon et al. |
| 2008/0245613 A1 | 10/2008 | Rutschmann et al. |
| 2010/0326380 A1 | 12/2010 | Fedeson et al. |

\* cited by examiner

CYLINDER HEAD COOLING SYSTEM

BACKGROUND/SUMMARY

Exhaust manifolds for internal combustion engines may be exposed to high thermal loads. Exhaust manifolds that are integrated into cylinder heads may experience particularly high thermal loading due to the heat transfer characteristics of the integrated design. Thermal loading of an integrated exhaust manifold and neighboring components can be reduced by incorporating cooling jackets into the cylinder head. The cooling jackets can reduce the thermal stresses on the cylinder head caused by heat generated during engine operation. For example, a cylinder head having an integrated exhaust manifold is disclosed in U.S. Pat. No. 7,367,294. An upper and a lower cooling jacket encompass a major portion of the cylinder head to remove heat from the cylinder head.

However, the inventors herein have recognized issues with the above described approach. For example, the upper and lower cooling jackets may not provide uniform cooling to the cylinder head. Additionally, the flange at the outlet of the exhaust manifold may experience higher temperatures than other portions of the cylinder head because of flow patterns of the exhaust gasses within the manifold. And, the upper and lower cooling jackets of the prior approach appear to provide limited cooling of the flange area. Furthermore, the cooling jacket of the prior approach may not provide a sufficient amount of cooling to reduce the possibility of thermal degradation on a turbocharger or components positioned downstream of the exhaust manifold. Additionally, the cooling jackets may not provide enough cooling to promote catalyst function in an emission control system positioned downstream of the exhaust manifold.

As such, various example systems and approaches are described herein. In one example a cylinder head with an integrated exhaust manifold is provided, the integrated exhaust manifold including an exhaust manifold flange. The cylinder head including a coolant inlet in communication with a cylinder head cooling system higher pressure passage, a coolant outlet in communication with a cylinder head cooling system lower pressure passage, and an exhaust flange coolant passage at least partially traversing the exhaust manifold flange and in communication with the coolant inlet and the coolant outlet.

In this way, the temperature of the flange may be reduced via the flange cooling subsystem so as to decrease thermal stresses on the cylinder head. The flange cooling subsystem can decrease the likelihood of thermal degradation of the cylinder head and downstream components, such as a turbocharger, emission control system, etc. Thus, performance of the engine, turbocharger, and emission control system can be improved when the cylinder head described above is utilized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A cylinder head with an integrated exhaust manifold is described herein. The cylinder head including an exhaust flange coolant passage in communication with a coolant inlet and a coolant outlet. The coolant inlet and outlet may be in communication with a higher and a lower pressure portion of a cylinder head cooling system. The cylinder head cooling system may be configured to flow coolant through passages in the cylinder head. In this way, cooling may be provided to an exhaust flange which may experience higher temperatures due to the flow characteristics within the integrated exhaust manifold. Moreover, the exhaust coolant passage may also provide cooling to neighboring components, such a turbocharger. In this way, thermal stresses on the exhaust flange and components downstream of the integrated exhaust manifold may be reduced. Thus, the likelihood of thermal degradation of the exhaust flange, cylinder block, or neighboring components, such as a turbocharger, may be reduced thereby increasing the components longevity.

Figure 1:
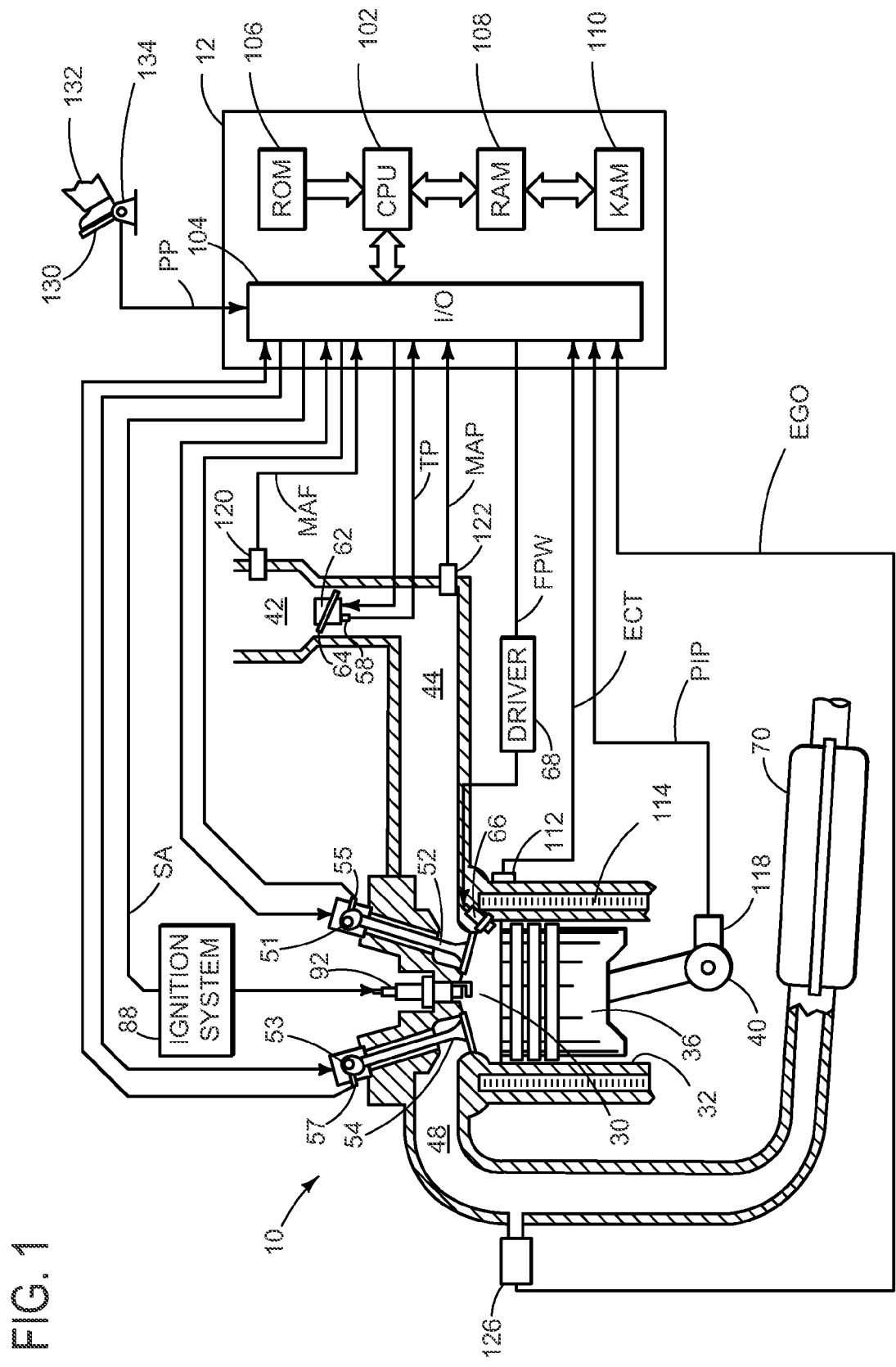
FIG. 1 shows a schematic depiction of an internal combustion engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail (not shown). The engine 10 of FIG. 1 is configured such that the fuel is injected directly into the engine cylinder, which is known to those skilled in the art as direct injection. Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

Figure 2:
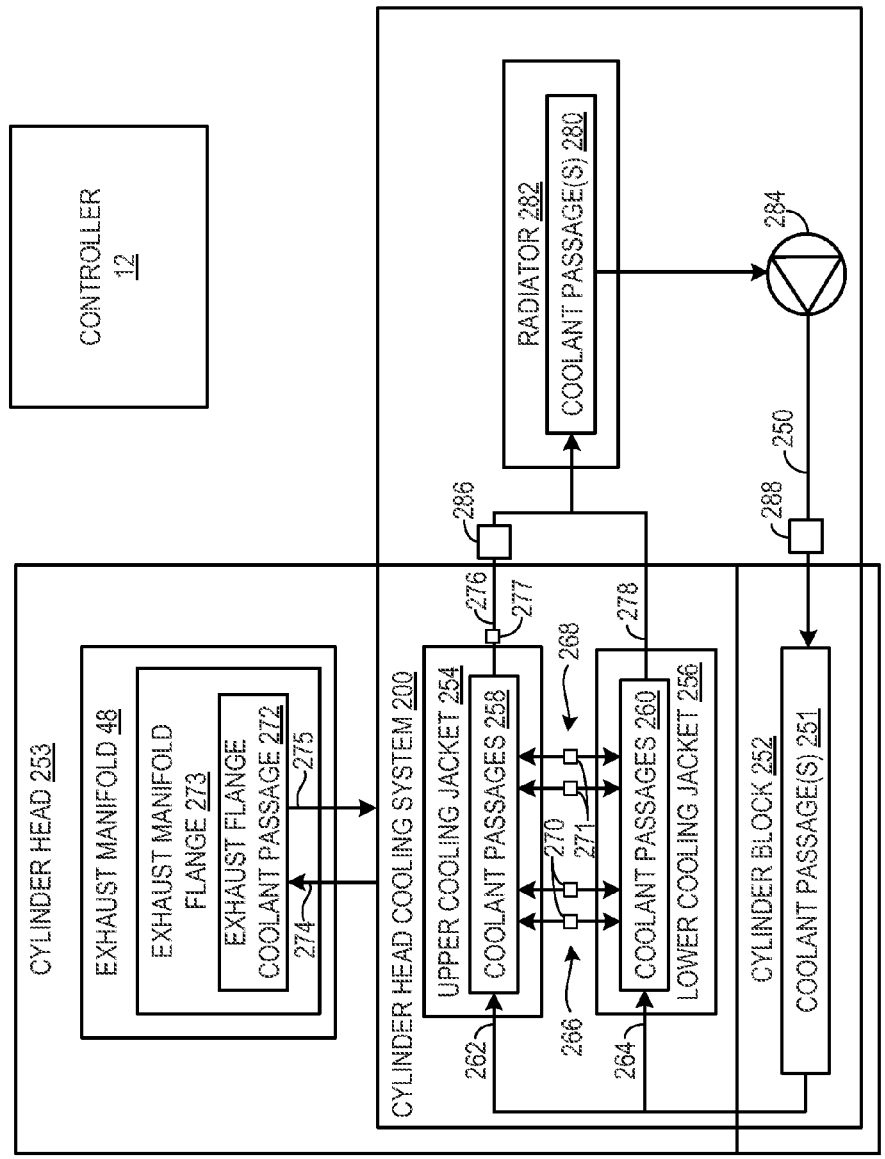
FIG. 2 shows a schematic depiction of a cylinder head and associated cooling system that may be included in the internal combustion engine shown in FIG. 1.

FIG. 2 shows a schematic depiction of a cylinder head cooling system 200 for an engine. It will be appreciated that the cooling system may be included in engine 10, shown in FIG. 1. The cooling system may be configured to remove heat from the engine. As discussed with greater detail herein, controller 12 may be configured to regulate the amount of heat removed from the engine via coolant circuit 250. In this way, the temperature of the engine may be regulated allowing the combustion efficiency to be increased as well as reducing thermal stress on the engine.

Cooling system 200 includes coolant circuit 250 traveling through one or more cylinder block coolant passage(s) 251 in a cylinder block 252. Water or another suitable coolant may be used as the working fluid in the coolant circuit. The cylinder block may include a portion of one or more combustion chambers. It will be appreciated that the coolant circuit may travel adjacent to the portions of the combustion chambers. In this way, excess heat generated during engine operation may be transferred to the coolant circuit. A cylinder head 253 may be coupled to the cylinder block to form a cylinder assembly. When assembled, the cylinder assembly may include a plurality of combustion chambers. Combustion chamber 30 shown in FIG. 1 may be included in the plurality of combustion chambers.

The cylinder head cooling system further includes an upper cooling jacket 254 and a lower cooling jacket 256. It will be appreciated that the upper and lower cooling jackets are integrated into the cylinder head. The upper cooling jacket includes a plurality of coolant passages 258. Likewise, the lower cooling jacket includes a plurality of coolant passages 260. As shown, the upper cooling jacket includes a coolant inlet 262 and the lower cooling jacket includes a coolant inlet 264. However, it will be appreciated that the upper and/or lower cooling jackets may include a plurality of inlets in other embodiments. For example, the upper cooling jacket may include a single inlet and the lower cooling jacket may include a plurality of inlets. It will be appreciated that the inlets of the upper and lower cooling jackets may be coupled to a common coolant passages in the cylinder block in some embodiments. In this way, the upper and lower cooling jackets receive coolant via their respective inlets from a common source included in an engine block of an engine. However, in other embodiments the inlets of the upper and lower cooling jackets may be coupled to separate coolant passages in the cylinder block.

A first set of crossover coolant passages 266 may fluidly couple the upper cooling jacket 254 to the lower cooling jacket 256. Similarly, a second set of crossover coolant passages 268 may fluidly couple the upper cooling jacket to the lower cooling jacket.

Each crossover coolant passage included in the first set of crossover coolant passages may include a restriction 270. Likewise, each crossover coolant passage included in the second set of crossover coolant passages may include a restriction 271. Various characteristics (e.g., size, shape, etc.) of the restrictions may be tuned during construction of cylinder head 253. Therefore, the restrictions 270 included in the first set of crossover coolant passages may be different in size, shape, etc., than the restrictions 271 included in the second set of crossover coolant passages. In this way, the cylinder head may be tuned for a variety of engines, thereby increasing the cylinder head's applicability. Although two crossover coolant passages are depicted in both the first and second sets of crossover coolant passages, the number of crossover coolant passages included in the first set and second sets of crossover coolant passages may be altered in other embodiments.

The crossover coolant passages allow coolant to travel between the cooling jackets at various points between the inlets and the outlets of both the upper and lower cooling jackets. In this way, the coolant may travel in a complex flow pattern where coolant moves between the upper and lower jackets, in the middle of the jacket and at various other locations within the jacket. The mixed flow pattern reduces the temperature variability within the cylinder head during engine operation as well as increases the amount of heat energy that may be removed from the cylinder head, thereby improving engine performance.

The cylinder head cooling system may be coupled to at least one coolant passage 272 included in an exhaust manifold flange 273. The exhaust manifold flange is included in an exhaust manifold 48. The coolant passage 272 includes a coolant inlet 274 and a coolant outlet 275. The coolant inlet may be coupled to a higher pressure coolant passage in the cylinder head cooling system and the coolant outlet may be coupled to a lower pressure coolant passage in the cylinder head coolant system. It will be appreciated that the higher pressure coolant passage may be included in the upper or lower cooling jacket. Likewise, the lower pressure coolant passage may be included in the upper or lower cooling jacket. In one particular example, the higher pressure coolant passage is included in the lower cooling jacket and the lower pressure coolant passage is included in the upper cooling jacket. In this way, coolant may be circulated around the flange, enabling heat to be removed from the flange, using an existing cooling system in the vehicle. Therefore, it will be appreciated that the manufacturing cost may be reduced when compared to other systems which may use independent cooling system to provide cooling to an exhaust system. Moreover, thermal stresses on the cylinder head flange as well as neighboring components may be reduced, thereby increasing the components longevity. The exhaust manifold coolant passage is discussed in greater detail herein with regard to FIGS. 3 and 5-10.

The upper cooling jacket includes an outlet 276. Outlet 276 may include a restriction 277. Additionally, the lower cooling jacket includes an outlet 278. It will be appreciated that in other embodiments outlet 278 may also include a restriction. The outlets from both the upper and lower cooling jackets may combine and be in fluidic communication. The coolant circuit may then travel through one or more radiator coolant passage(s) 280 included in a radiator 282. The radiator enables heat to be transferred from the coolant circuit to the surrounding air. In this way, heat may be removed from the coolant circuit.

A pump 284 may also be included in the coolant circuit. A thermostat 286 may be positioned at the outlet 276 of the upper cooling jacket. A thermostat 288 may also be positioned at the inlet of the one or more coolant passage(s) 251 of the cylinder block 252. Additional thermostats may be positioned at other locations within the coolant circuit in other embodiments, such as at the inlet or outlet of the one or more coolant passage(s) in the radiator, the inlet or outlet of the lower cooling jacket, the inlet of the upper cooling jacket, etc. The thermostats may be used to regulate the amount of fluid flowing through the coolant circuit based on the temperature. In some examples, the thermostats may be controlled via controller 12. However in other examples, the thermostats may be passively operated.

It will be appreciated that controller 12 may regulate the amount of pressure head provided by pump 284 to adjust the flow-rate of the coolant through the circuit and therefore the amount of heat removed from the engine. Furthermore, in some examples controller 12 may be configured to dynamically adjust the amount of coolant flow through the upper cooling jacket via thermostat 286. Specifically, the flow-rate of the coolant through the upper cooling jacket may be decreased when the engine temperature is below a threshold value. In this way, the duration of engine warm-up during a cold start may be decreased, thereby increasing combustion efficiency and decreasing emissions. It will be appreciated that the systems and components in FIG. 2 are schematically depicted and not meant to depict the relative location of the components.

Figure 3:
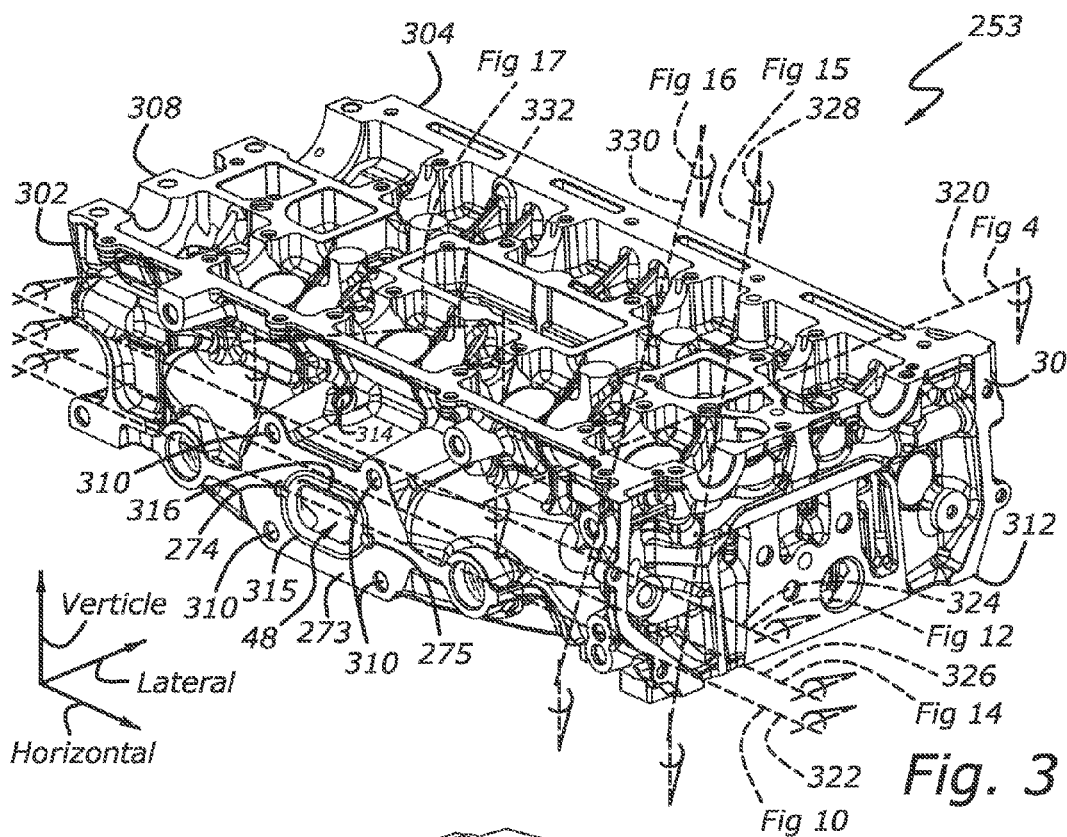
FIG. 3 shows an illustration of an exemplary cylinder head.

FIG. 3 shows a perspective view of an example cylinder head 253. The cylinder head may be configured to attach to a cylinder block (not shown) which defines one or more combustion chambers having a piston reciprocally moving therein. The cylinder head may be cast out of a suitable material such as aluminum. Other components of an assembled cylinder head have been omitted. The omitted components include a camshafts, camshaft covers, intake and exhaust valves, spark plugs, etc.

As shown, cylinder head 253 includes four perimeter walls. The walls include a first and a second side wall, 302 and 304 respectively. The four perimeter walls may further include a front end wall 306 and a rear end wall 308.

A bottom wall 312 may be configured to couple to the cylinder head (not shown) thereby forming the engine combustion chambers, as previously discussed. The cylinder head may further include a de-gas port 314 including a valve configured to remove gas from the upper cooling jacket. In this way, the amount of gas in both the upper and lower cooling jacket may be reduced. The de-gas port is positioned in an area adjoining an upper surface of the upper cooling jacket. In some examples, the de-gas port may be positioned at a crest (e.g., substantially highest vertical point) in the upper cooling jacket. However in other examples, the de-gas port may be positioned in another suitable location. The de-gas port may decrease the amount of gas (e.g., air and/or water vapor) in both the upper and lower cooling jacket, thereby increasing operating efficiency of the upper and lower cooling jackets.

Cylinder head 253 further includes exhaust manifold 48 to which a plurality of exhaust runners are coupled. The exhaust runners are illustrated and discussed in more detail with regard to FIGS. 12-17. The exhaust runners may be coupled to the exhaust valves for each combustion chamber. In this way, the exhaust manifold and exhaust runners may be integrated into the cylinder head casting. The integrated exhaust runners have a number of benefits, such as reducing the number of parts within the engine thereby reducing cost throughout the engine's development cycle. Furthermore, inventory and assembly cost may also be reduced when an integrated exhaust manifold is utilized.

The cylinder head further includes exhaust manifold flange 273 surrounding the exhaust manifold 48. The flange includes bolt bosses 310 or other suitable attachment apparatuses configured to attach to a downstream exhaust component, such as an exhaust conduit or an inlet of a turbine included in a turbocharger. In this way, the turbocharger may be mounted directly to the cylinder head reducing losses within the engine. The turbocharger may include an exhaust driven turbine coupled to a compressor via a drive shaft. The compressor may be configured to increase the pressure in the intake manifold.

Figure 10:
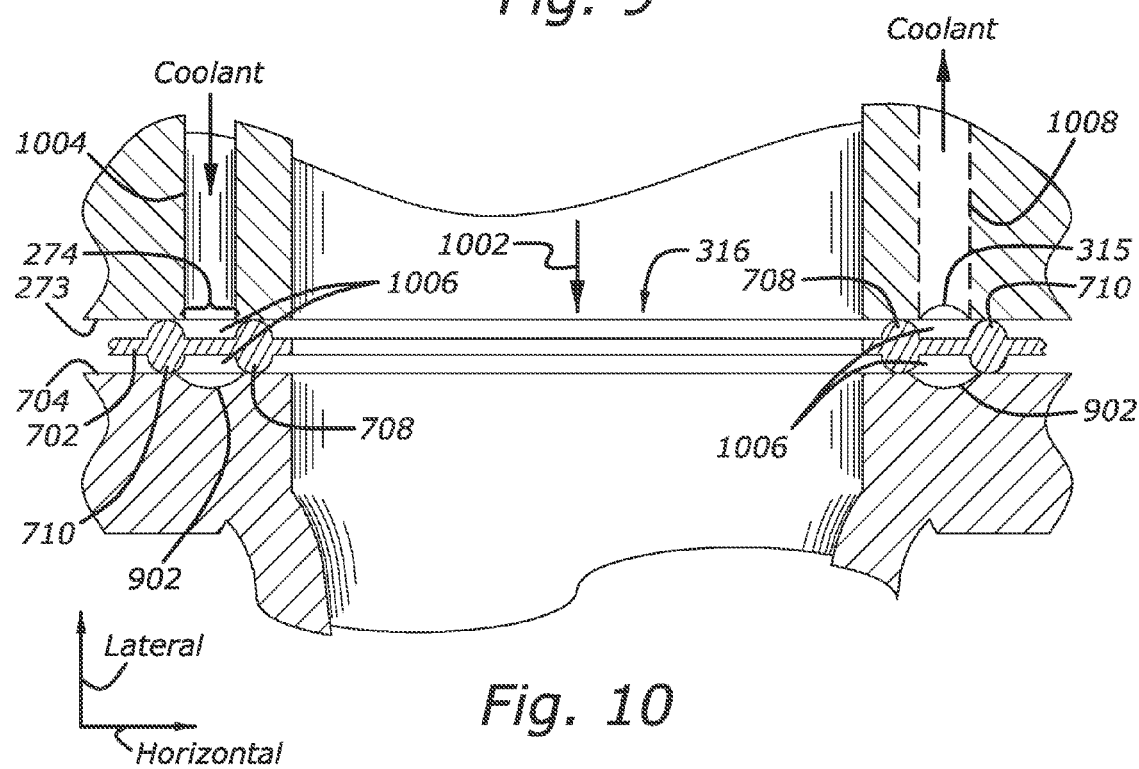
FIG. 10 shows a cross-sectional view of the exhaust manifold flange, sealing gasket, and second flange as well as the corresponding coolant inlet, coolant outlet, and exhaust flange coolant passage.

Additionally, the cylinder head further includes coolant inlet 274 in communication with a higher pressure passage in cylinder head cooling system 200, shown in FIG. 2, and a coolant outlet 275 in communication with a lower pressure passage in the cylinder head cooling system. As shown, the higher and lower pressure passages extend into the cylinder head. The higher and lower pressure passages are shown in FIG. 10. It will be appreciated that the higher and/or lower pressure passages in the cylinder head cooling system may be in either the upper or lower cooling jacket. As shown, the exhaust manifold flange further includes an exhaust manifold flange channel 315 traversing the exhaust manifold flange. The flange channel may be cast or may be milled after the cylinder head is cast. As depicted, the exhaust manifold flange channel extends around the entire exhaust manifold flange. In other words, the exhaust manifold flange channel circumvents exhaust outlet 316. However, in other embodiments the flange channel may partially traverse the exhaust manifold flange. The flange channel may define a boundary of an exhaust flange coolant passage at least partially traversing the exhaust manifold flange. The exhaust flange cooling passage may be coupled to the coolant inlet 274 and the coolant outlet 275. In this way, coolant may be circulated through the exhaust flange coolant passage. The exhaust flange coolant passage may be interposed between the exhaust manifold flange and a flange of a downstream component, such as a turbocharger, exhaust passage, emission control device, etc., discussed in greater detail herein. Cutting plane 320 defines the cross-section shown in FIG. 4. Cutting plane 322 defines the cross-section shown in FIG. 10. Cutting plane 324 defines the cross-section shown in FIG. 12. Cutting plane 326 defines the cross-section shown in FIG. 14. Cutting plane 328 defines the cross-section in shown FIG. 15. Cutting plane 330 defines the cross-section shown in FIG. 16. Cutting plane 332 defines the cross-section shown in FIG. 17.

Figure 4:
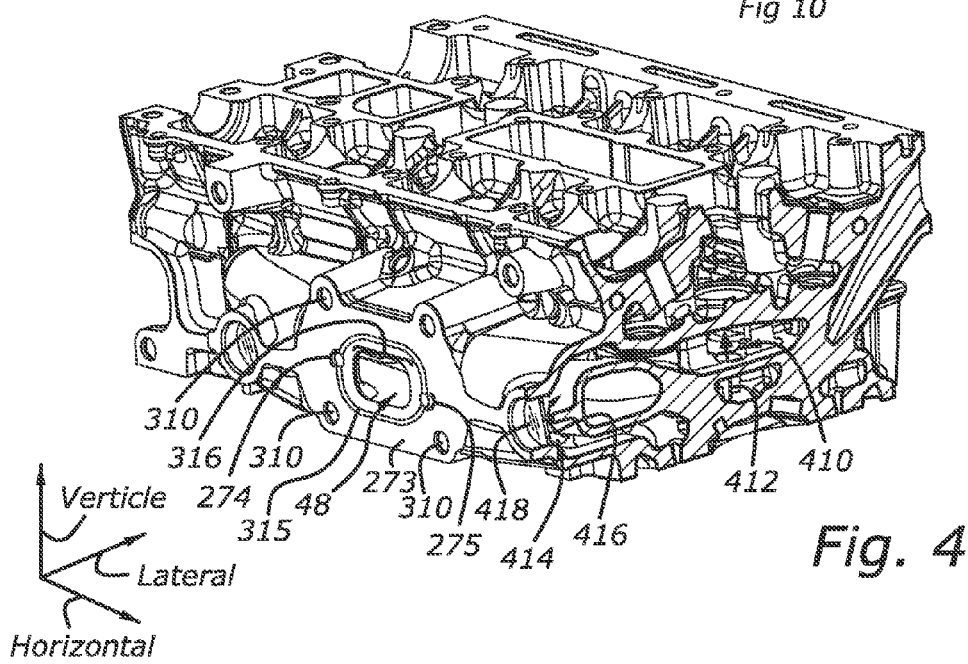
FIG. 4 shows a cross-sectional view of the cylinder head shown in FIG. 3, the cylinder head including crossover coolant passages.

FIG. 4 shows a cut-away view of cylinder head 253 shown in FIG. 3. A first crossover coolant passage 410 is shown. The first crossover coolant passage 410 may be included in the first set of crossover coolant passages 266 shown in FIG. 2. Continuing with FIG. 4, arrow 412 denotes the general path of the fluid traveling through the first crossover coolant passage from the lower cooling jacket to the upper cooling jacket. As shown, the coolant travels in a substantially vertical direction through a vertically aligned passage, relative to vertical piston motion of pistons in the cylinder. It will be appreciated that the width of the first crossover coolant passage may be altered during construction via machining. In this way, the crossover coolant passage may be tuned to a desired specification.

The first set of crossover coolant passages may be radially aligned with two or more cylinders included in the engine. It will be appreciated that the alignment may be about a single line of symmetry. The first set of crossover coolant passages may be also spaced away from the inlet and/or exhaust ports in the engine. Positioning the first set of crossover coolant passages in alignment with two or more cylinder and away from the inlet and/or exhaust ports enables the structural integrity of the cylinder head to be increased when compared to crossover coolant passages that may be positioned adjacent to inlet or exhaust ports which may decrease the thickness of the metal surrounding the exhaust valve, thereby increasing the likelihood of exhaust or intake valve degradation or failure. Furthermore, a larger diameter flow channel may be utilized when the crossover flow channels are aligned in this way when compared to crossover coolant channels that are positioned adjacent to intake or exhaust valves.

A second crossover coolant passage 414 is also shown. The second crossover coolant passage 414 may be included in the second set of crossover coolant passages 268 shown in FIG. 2. The second crossover coolant passage is adjacent to a periphery of the cylinder head and spaced away from the exhaust outlet 316. Therefore, it will be appreciated that the second set of crossover coolant passages may be adjacent to a periphery of the cylinder head and spaced away from the exhaust manifold. Arrow 416 denotes the general path of the fluid traveling through the first crossover coolant passage from the lower cooling jacket to the upper cooling jacket. As shows cup 418 both directs and restricts flow through the first crossover coolant passage. The flow pattern of the coolant through the second set of crossover coolant passages follows an arc. When a cup is used to direct the flow of coolant through the second crossover coolant passage, this enables the construction process (e.g., machining) of the cylinder head to be simplified.

Figure 5:
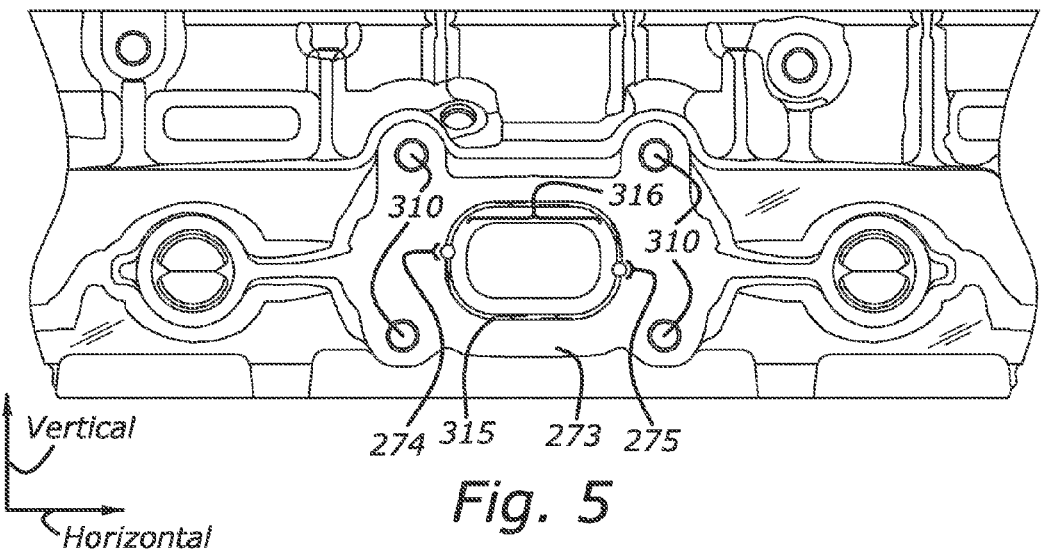
FIG. 5 shows a side view of an exhaust manifold flange included in the cylinder head shown in FIG. 3.

FIG. 5 shows a side view of the exhaust manifold flange 273 and exhaust outlet 316 of exhaust manifold 48, shown in FIG. 3. Similar parts are labeled accordingly.

Figure 6:
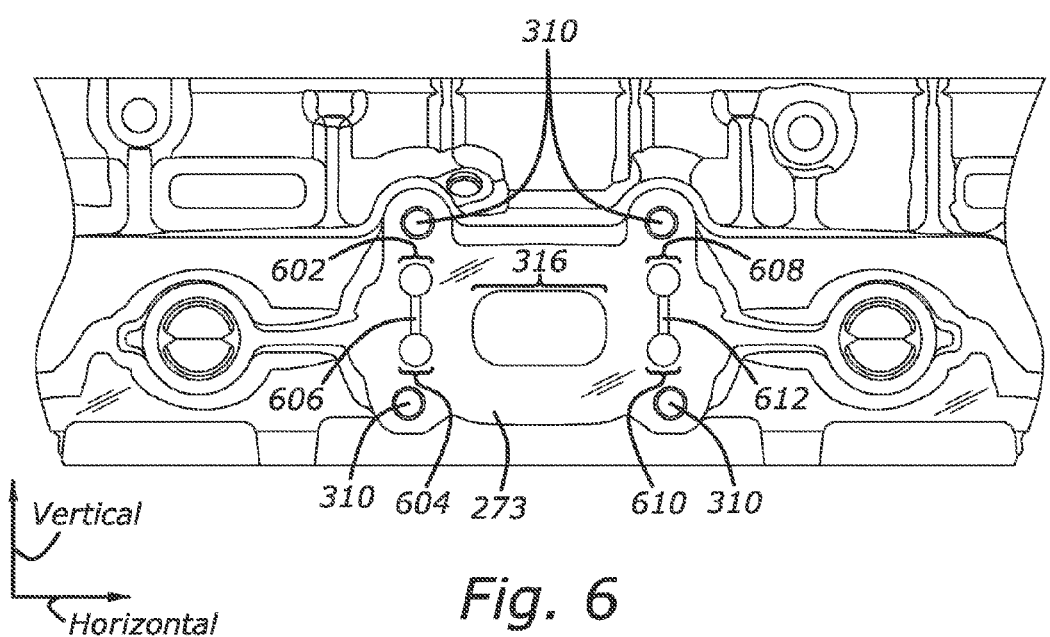
FIG. 6 shows another embodiment of the exhaust manifold flange included in the cylinder head shown in FIG. 3.

FIG. 6 shows a side view of an alternate embodiment of exhaust manifold flange 273. As shown, the exhaust manifold flange includes a first coolant inlet 602 and a first coolant outlet 604. As previously discussed, the first coolant inlet and outlet are coupled to a higher pressure passage in the cylinder head cooling system and a lower pressure passage in the cylinder head cooling system. A first flange channel 606 extends between the first coolant inlet and the first coolant outlet. Additionally, the exhaust manifold flange includes a second coolant inlet 608 and a second coolant outlet 610. A second flange channel 612 extends between the second coolant inlet and the second coolant outlet. Further, in some embodiments channels may also extend between the first and second coolant inlets and the first and second coolant outlets. The first and second coolant channels may define a boundary of an exhaust flange coolant passage, discussed in greater detail herein with regard to FIGS. 7-10.

Figure 7:
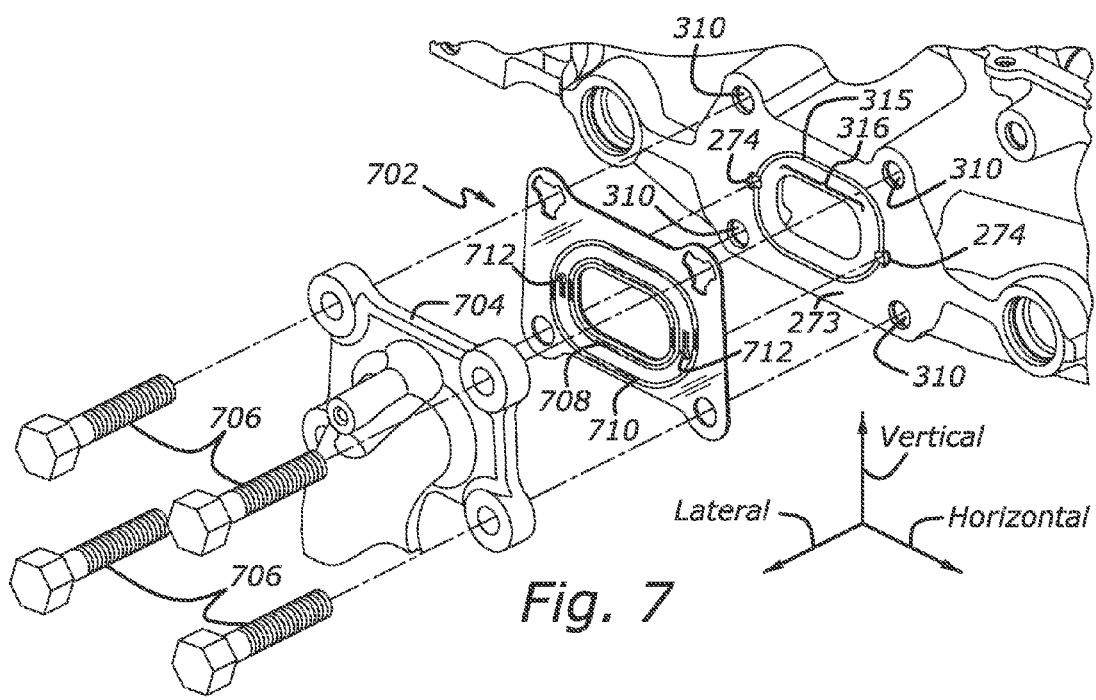
FIG. 7 shows an exploded view of an exemplary exhaust manifold flange, sealing gasket, and second flange.

FIG. 7 shows an exploded view of exhaust manifold flange 273, a sealing gasket 702, and a second flange 704. When assembled bolts 706 or other suitable attachment apparatuses may couple the aforementioned components. Therefore, when assembled the sealing gasket is interposed between the exhaust manifold flange and the second flange.

Sealing gasket 702 may include an inner seal 708 and an outer seal 710. The inner and outer seals define a boundary of the exhaust flange cooling passage. Thus, the inner and outer seal enable coolant to be circulated around the exhaust manifold flange and substantially prevent coolant from leaking into the exhaust stream or the exterior of the cylinder head.

In some examples, the inner and outer seals may be multi-layered metal embossments. Therefore, the seals may be raised. In other words, the seals may have a greater lateral thickness than other portions of the sealing gasket. However, other suitable seals may be utilized on other examples. For example, in addition to or as an alternative rubber seals may be utilized. Though metal seals may be preferred due to their ability to withstand high temperatures than rubber seals. The inner seal may be in face sharing contact with both the exhaust manifold flange as well as flange 704. Additionally, the outer seal may be in face sharing contact with both the exhaust manifold flange as well as flange 704.

The sealing gasket further includes transfer openings 712. As shown, the transfer openings are aligned with the coolant inlet 274 and the coolant outlet 275. However, other alignments are possible. In this way, coolant may be circulated around the exhaust manifold flange as well as flange 704. It will be appreciated that this may not only reduce the temperature of the exhaust manifold flange, decreasing the likelihood of thermal degradation of the cylinder head but also reduces the temperature of neighboring components, such as a turbocharger, thereby reducing the likelihood of thermal degradation of the neighboring component.

However in other embodiments, sealing gasket 702 may not include transfer openings 712 and the inner and outer seals (708 and 710) may only be in face sharing contact with the exhaust manifold flange. Thus, coolant may be circulated around the exhaust manifold flange. However, heat may be transferred from flange 704 to the coolant via conduction through the sealing gasket 702.

Figure 8:
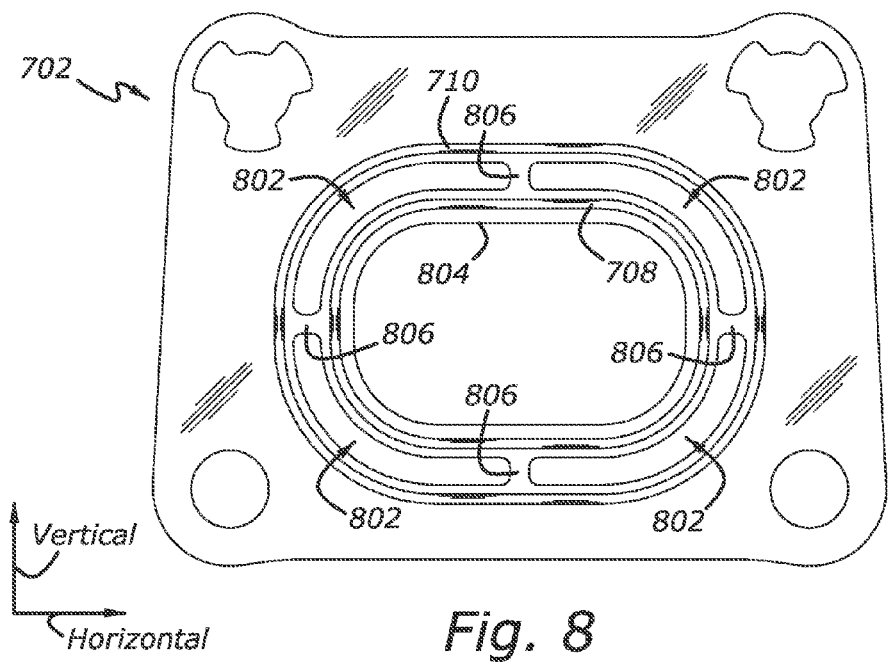
FIG. 8 shows another embodiment of a sealing gasket.

FIG. 8 shows an alternate embodiment of sealing gasket 702. As shown an opening 802 extends around the sealing gasket. In other words, the opening circumvents the inner edge 804 of the sealing gasket. As shown, connectors 806 span opening 802. It will be appreciated that when connectors are utilized the relative position of the inner seal to the outer seal may be substantially fixed reducing the likelihood of improper assembly, such as improper placement (e.g., spacing) of the inner and outer seal. In some examples, the lateral distance of one or more of the connectors may not be equal. It will be appreciated that when the connectors are positioned in this way a coolant flow pattern may be generated that reduces losses within the exhaust flange coolant passage. In this way, the efficiency of the exhaust manifold cooling system may be increased when compared to a cooling system having connectors positioned with equivalent lateral distances.

Figure 9:
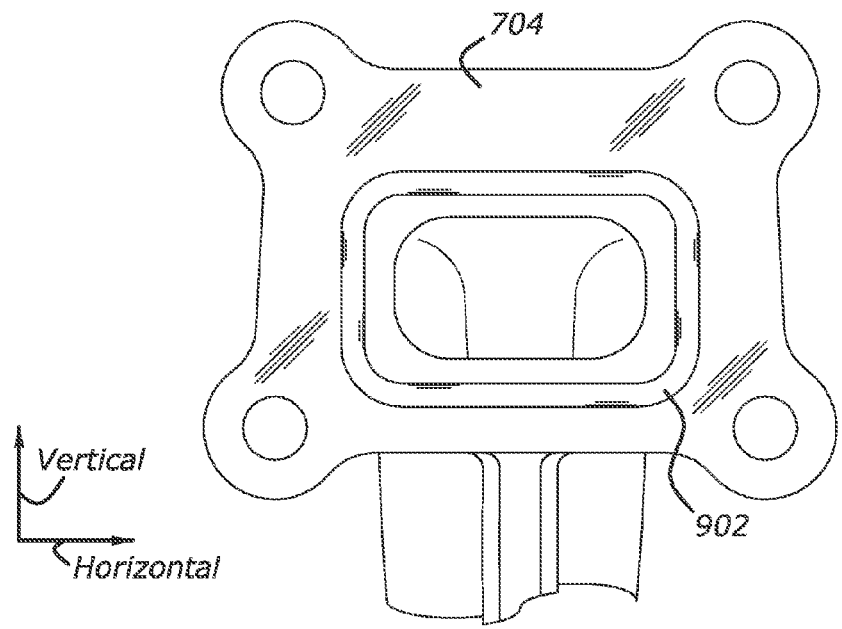
FIG. 9 shows a side view of the second flange shown in FIG. 7.

FIG. 9 shows flange 704. Flange may be included in a downstream component, such as a turbocharger or an exhaust conduit. Flange 704 includes a channel 902. Channel 902 may be milled or cast. However, in other embodiments channel 902 may not be included in flange 704. Channel 902 may define a boundary of the exhaust flange coolant passage. Channel 902 allows a greater amount of coolant to be circulated around flange 704 increasing the amount of heat that may be removed from the flange and associated component.

FIG. 10 shows a cross-sectional view of exhaust manifold flange 273, sealing gasket 702, and flange 704. The general direction of exhaust gas flow through the exhaust outlet 316 is denoted via arrow 1002. Coolant in the cylinder head cooling system flows from a higher pressure passage 1004 into the exhaust manifold coolant passage 1006 via coolant inlet 274. As previously discussed, the inner seal 708 and the outer seal 710 define a boundary of the exhaust flange coolant passage 1006. Furthermore, exhaust manifold flange channel 315 and channel 902 may also define a boundary of the exhaust flange coolant passage 1006. However in other examples, flange channel 315 may not be included in the exhaust manifold flange and/or channel 902 may not be included in flange 704. It will be appreciated that coolant may travel through transfer openings 712, shown in FIG. 7. Thus, during operation of the cylinder head cooling system coolant flows around a portion of the exhaust manifold flange 273 as well as flange 704. The coolant may exit the exhaust flange coolant passage 1006 via coolant outlet 275 (shown in FIGS. 3, 4, 5, and 7) coupled to a lower pressure passage 1008 in the cylinder head cooling system. In this way, heat may be removed from both the exhaust manifold flange 273 as well as flange 704, reducing the thermal stresses on the cylinder head as well as downstream components such as a turbocharger.

Figure 11:
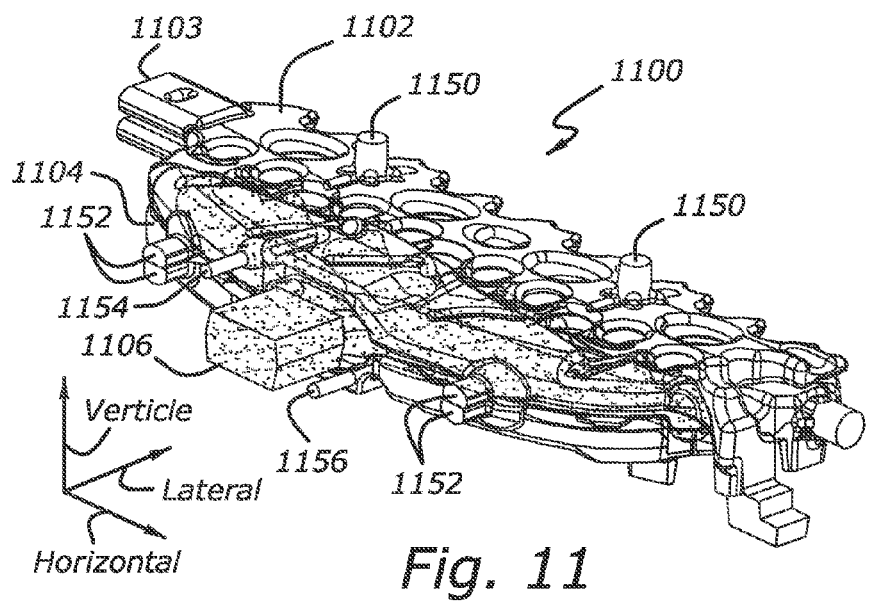
FIG. 11 shows a composite core for casting the cylinder head shown in FIG. 3.

FIG. 11 shows a composite core 1100 including an upper core 1102, a lower core 1104, and an exhaust manifold port core 1106. These casting cores are positioned as shown and would be placed together with another into an exterior mold during a casting process. Metal poured into the mold may then take the shape of the molds, hardening and forming cylinder head 253. Such a casting process is well known in the art.

As shown, vertically aligned protrusions 1150 included in both the upper and lower core may define the first set of crossover coolant passages 266. It will be appreciated that the crossover coolant passages may be vertically orientated relative to piston motion. The laterally aligned extensions 1152 in both the upper and lower core may define the second set of crossover coolant passages 268. It will be appreciated that horizontally aligned extension 1103 may define outlet 276 of the upper cooling jacket including restriction 277. As shown, the casting includes protrusions 1154 and 1156 forming coolant passages extending from the flange into the cylinder head. The ends of protrusions form coolant inlet 274 and coolant outlet 275. However, it will be appreciated that in other examples the coolant passages may be milled after the cylinder head is cast. The upper and lower cooling jackets define a plurality of coolant passages, as previously discussed. Furthermore, the exhaust manifold port core defines an exhaust manifold including a plurality of exhaust runner fluidly coupled to an exhaust outlet.

Figure 12:
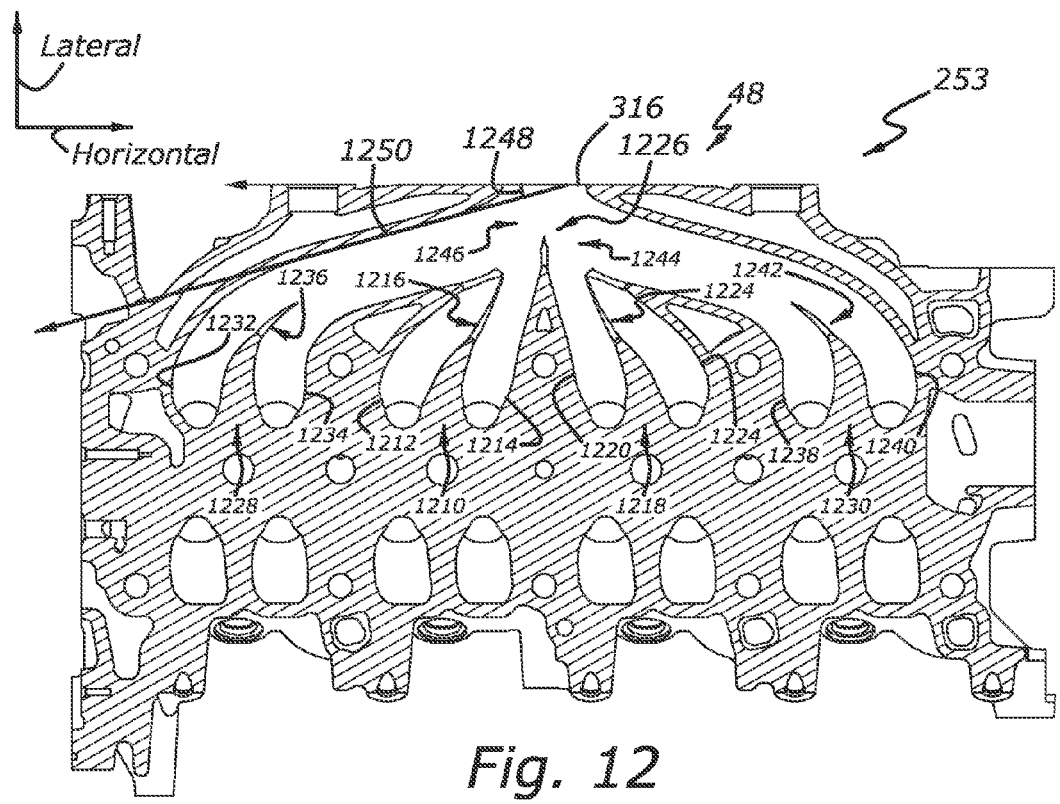
FIG. 12 shows a cross-sectional view of exhaust runners included in the cylinder head shown in FIG. 3.

FIG. 12 shows a cross-sectional view of exhaust manifold 48 included in the cylinder head 253 shown in FIG. 3. Exhaust outlet 316, included in the exhaust manifold, is coupled to a first inner exhaust runner 1210 for a cylinder positioned between two other cylinders. The first inner exhaust runner 1210 includes a first entry conduit 1212 and a second entry conduit 1214 meeting at a confluence area 1216. The first and second entry conduits include a first and a second valve guide entry point (1410 and 1412), shown in FIG. 14. It will be appreciated that the valve guide entry points may be configured to each receive a portion of an exhaust valve. Exhaust outlet 316 is also coupled to a second inner exhaust runner 1218. The second inner exhaust runner 1218 includes a first entry conduit 1220 and a second entry conduit 1222 meeting at a confluence area 1224. The first and second entry conduit include a first and second valve guide entry point (1414 and 1416), shown in FIG. 14. The exhaust runners receive exhaust gases from a cylinder during engine operation. The valve guide entry points allow exhaust valves to be positioned in the cylinder head such that the exhaust valves can limit gas flow from the cylinder to the exhaust runners. Therefore, each inner exhaust runner includes two entry conduits coupled to two exhaust valves. However, in other examples, the first and second inner exhaust runner may each include a single valve guide entry point. Therefore, in such an example, the first inner exhaust runner and the second inner exhaust runner each include a single entry conduit.

It will be appreciated that both of the inner exhaust runners may be coupled to cylinders positioned between two other cylinders. The first and second inner exhaust runners may converge at a confluence area 1226 for mixing exhaust gases from the inner cylinders. As shown, the first and second inner exhaust runners may be directed in a substantially straight path to the exhaust outlet 316.

The exhaust manifold further includes a first outer exhaust runner 1228 and a second outer exhaust runner 1230 coupled to exhaust outlet 316. The first and second outer exhaust runners are coupled to cylinders positioned at each the end of a cylinder bank. In other words, the first and second outer exhaust runners are coupled to the outermost cylinders in a cylinder bank with an inline configuration. The first outer exhaust runner includes a first entry conduit 1232 and a second entry conduit 1234 meeting at a confluence area 1236. The first and second entry conduits (1232 and 1234) include a first valve guide entry port and a second valve guide entry port (1418 and 1420) shown in FIG. 14. Likewise, the second outer exhaust runner includes a first entry conduit 1238 and a second entry conduit 1240 meeting at a confluence area 1242. The first and second entry conduits (1238 and 1240) include a first valve guide entry point and a second valve guide entry point (1422 and 1424) shown in FIG. 14.

The second outer exhaust runner 1230 and the second inner exhaust runner 1218 may converge at a confluence area 1244 for mixing exhaust gases from the inner and outer cylinders. Likewise, the first outer exhaust runner 1228 the first inner exhaust runner 1210 may converge at a confluence area 1246 for mixing exhaust gases from the inner and outer cylinders.

The first outer exhaust runner has a lead-in angle 1248. Lead-in angle 1248 may be defined as the intersection of a line parallel to a straight portion of outer-wall 1250 of the first outer exhaust runner 1228 and a plane spanning exhaust outlet 316. The outer-wall of the first outer exhaust runners may be a vertically aligned wall adjacent to side wall 302, shown in FIG. 3. Due to the symmetry of the exhaust manifold, it will be appreciated that the second outer exhaust runner has an identical lead-in angle.

It has been found unexpectedly that when the outer exhaust runners have a lead-in angle between 15 and 17 degrees flow separation in the exhaust gases during engine operation may be reduced, thereby reducing losses in the exhaust manifold. Specifically, a lead-in angle of 15.5 degrees may be utilized to decrease flow separation in the exhaust manifold. A lead-in angle within this range may also reduce impingement of the exhaust gases on the exhaust manifold walls. Furthermore, a lead-in angle within this range may also reduce the amount of cross-talk between the exhaust valves. For example, reaction waves generated during exhaust valve operation in the outer exhaust runners may be propagated downstream of the exhaust manifold as opposed to in the other exhaust runners. Therefore, exhaust valves having a lead-in angle between 15 and 17 degrees are utilized. In this way, engine operation may be improved via the reduction of cross-talk between the exhaust valves.

Figure 13:
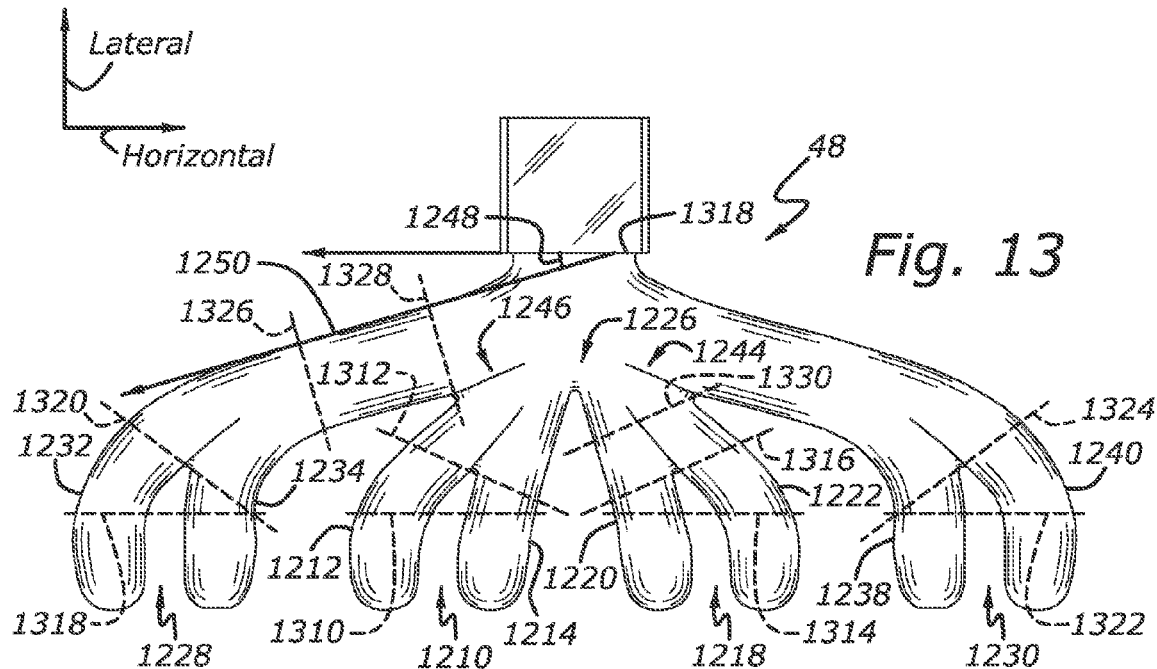
FIG. 13 shows an exhaust manifold port core included in the composite core shown in FIG. 11.

FIG. 13 shows the exhaust manifold port core of the exhaust manifold shown in FIG. 12. Although a core print is shown, it will be appreciated that exhaust gases may travel through the passages defined by the exhaust manifold port core. Therefore, corresponding parts are labeled accordingly.

Line 1318 indicates a cutting plane of a location of the beginning of a region of the exhaust manifold port core of a first outer exhaust runner 1228 where the cross-sectional area of first outer exhaust runner 1228 is measured from. Line 1320 indicates a cutting plane of an example location on the curved portion of first outer exhaust runner 1228 where the cross-sectional area of the curved portion of first outer exhaust runner 1228 can be measured. Lines 1326 and 1328 indicate cutting planes of example locations on the straight portion of first outer exhaust runner 1228 where the cross-sectional area of the straight portion of first outer exhaust runner 1228 can be measured. At line 1318, first outer exhaust runner 1228 has a first cross-sectional area. At line 1320, first outer exhaust runner 1228 has a second cross-sectional area. At lines 1326 and 1328, first outer exhaust runner 1228 has a third cross-sectional area. The first outer exhaust runner 1228 expands from the first cross-sectional area to the second cross-sectional area and contracts from the second cross-sectional area to the third cross-sectional area. Similarly, line 1322 of the second outer exhaust runner 1230 indicates a cutting plane of a location of the beginning of a region of the exhaust manifold port core where the cross-sectional of the exhaust runner is measured from. Line 1324 indicates a cutting plane of an example location on the curved portion of the second outer exhaust runner 1230 where the cross-sectional area of the curved portion of second outer exhaust runner 1230 can be measured.

Line 1310 indicates a cutting plane of an example location of the beginning of a region of the exhaust manifold port core of the first inner exhaust runner 1210 where the cross-sectional area of inner exhaust runner 1210 is measured from. Line 1312 indicates a cutting plane of an example location of the first inner exhaust runner 1210 where the cross-sectional area of inner exhaust runner 1210 is measured. At line 1310, the first inner exhaust runner 1210 has a first cross-sectional area. At line 1312, first inner exhaust runner 1210 has a second cross-sectional area. The first cross-sectional area is greater than the second cross-sectional area. Similarly, line 1314 indicates a cutting plane of an example location of the beginning of a region of the exhaust manifold port core of second inner exhaust runner 1218 where the cross-sectional area of inner exhaust runner 1218 is measured from. Line 1316 indicates a cutting plane of an example location of second inner exhaust runner 1218 where the cross-sectional area of inner exhaust runner 1218 is measured. Line 1330 indicates a cutting plane of another example location of second inner exhaust runner 1218 where the cross-sectional area of the second inner exhaust runner 1218 is measured.

Figure 14:
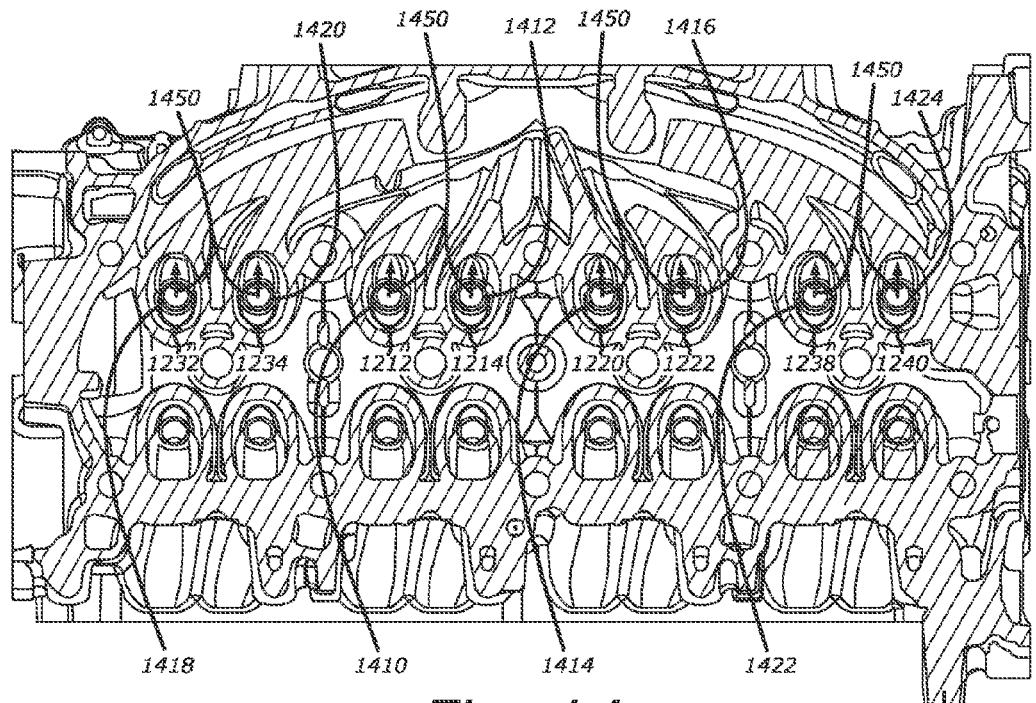
FIG. 14 shows a cross-sectional view of entry conduits included in the cylinder head shown in FIG. 3.

FIG. 14 shows a cross-sectional view of the first valve guide entry point 1410 and the second valve guide entry point 1412 and corresponding entry conduits (1212 and 1214) for the first inner exhaust runner 1210. Additionally, FIG. 14 shows the first valve guide entry point 1414 and the second valve guide entry point 1416 and corresponding entry conduits (1220 and 1222) for the second inner exhaust runner 1218. FIG. 14 further shows the first valve guide entry point 1418 and the second valve guide entry point 1420 and corresponding entry conduits (1232 and 1234) for the first outer exhaust runner 1228. FIG. 14 also shows the first valve guide entry point 1422 and the second valve guide entry point 1424 and corresponding entry conduits (1238 and 1240) for the second outer exhaust runner 1430. The cross-sectional area of the first inner exhaust runner between each of the two valve guide entry points (1410 and 1412) may be substantially 716 mm$^2$. For reference, the leading boundary, line 1310, and the trailing boundary, line 1312, of the sections of the first inner exhaust runner 1210 are shown in FIG. 13. It will be appreciated that the cross-sectional area is measured via a plane spanning the exhaust runner and perpendicular to a line 1450 tangent to the central axis of the exhaust runner. Likewise, the cross-sectional area of the second inner exhaust runner 1218 between each of the two valve guide entry points (1414 and 1416) may be substantially 716 mm$^2$. For reference, the leading boundary, line 1314, and the trailing boundary, line 1316, of the sections of the second inner exhaust runner 1218 are shown in FIG. 13. The cross-sectional area of the first outer exhaust runner between each of the two valve guide entry points (1418 and 1420) may be substantially 716 mm$^2$. For reference, the leading boundary, line 1318, has a cross-sectional area that may be substantially 716 mm$^2$ are shown in FIG. 13 Likewise, the cross-sectional area of the second outer exhaust runner 1230 between each of the two valve guide entry points (1422 and 1424) may be substantially 716 mm$^2$. For reference, the leading boundary, line 1322, has a cross-sectional area that may be substantially 716 mm$^2$ are shown in FIG. 13.

Figure 15:
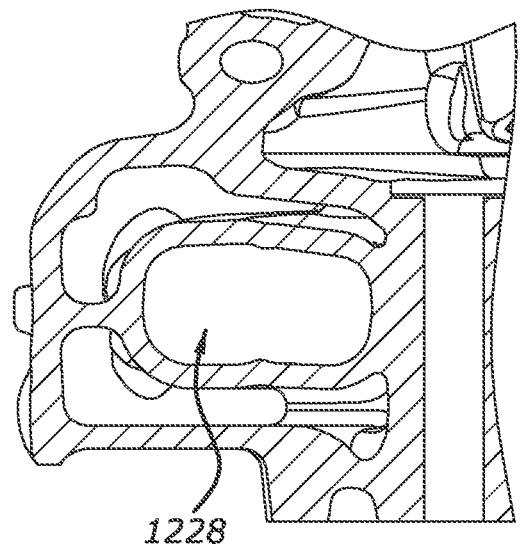
FIG. 15 shows a cross-sectional view a first outer exhaust runner included in the cylinder head shown in FIG. 3.

FIG. 15 shows a cross-sectional view of the first outer exhaust runner 1228 in a curved portion of the exhaust runner downstream of the valve guide entry points (1418 and 1420) and upstream of confluence area 1246 in the direction of exhaust flow from the cylinder, shown in FIG. 12. As previously discussed, the cross-sectional area of the first outer exhaust runner begins at a first area and expands as the exhaust runner curves and contracts as the exhaust runner reaches a confluence point where exhaust gases from one cylinder mix with exhaust gases of another cylinder. The first outer exhaust runner 1228 starts at the first area of substantially 716 mm$^2$ at a location downstream of the valve guide entry points (1418 and 1420) in a direction of exhaust flow.

The cross-sectional area of the first outer exhaust runner in the curved portion of the exhaust runner shown in FIG. 15 may be 716 mm$^2$. For reference, the leading boundary, line 1320, and trailing boundary, line 1326, of the curved portion of the first outer exhaust runner is shown in FIG. 13. As previously discussed the cross-sectional area may be measured via a plane spanning the exhaust runner and perpendicular to a line tangent to the central axis of the exhaust runner. Due to the symmetry within the exhaust manifold the second outer exhaust runner is similar in geometry and size to the first outer exhaust runner.

Figure 16:
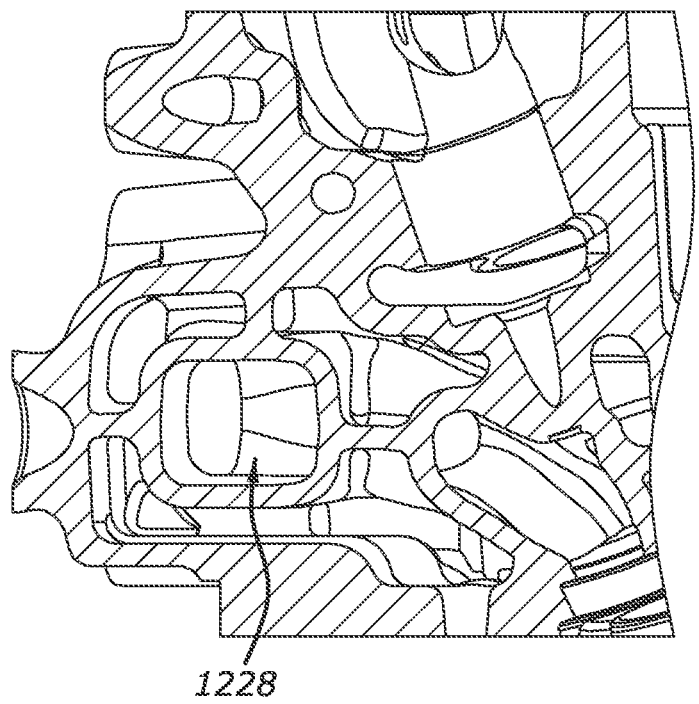
FIG. 16 shows a cross-sectional view of another portion of the first outer exhaust runner included in the cylinder head shown in FIG. 3.

FIG. 16 shows a cross-sectional view of the first outer exhaust runner 1228 in a straight portion of the exhaust runner downstream of the valve guide entry points (1418 and 1420) in the direction of exhaust flow and upstream of confluence area 1246. For reference, the leading boundary, line 1326, and trailing boundary, line 1328, of the straight portion of the first outer exhaust runner is shown in FIG. 13.

The cross-sectional area of the straight portion of the first outer exhaust runner may be less than the cross-sectional area of the curved portion of the first outer exhaust runner. Therefore, the cross-sectional area along the length of the first outer exhaust runner contracts in a straight portion of the exhaust runner. In particular, the cross-sectional area of the straight portion of the exhaust runner shown may be 651 mm$^2$. Due to the symmetry within the exhaust manifold, the second outer exhaust runner is similar in geometry and size to the first outer exhaust runner. Therefore, the second outer exhaust runner may also experience an expansion and downstream contraction.

It has been unexpectedly found that the expansion and subsequent contraction in the first and second outer exhaust runners may reduce flow separation of the exhaust gases within the outer exhaust runners, thereby decreasing losses within the exhaust manifold. When losses within the exhaust manifold are reduced the energy delivered to the turbine of the turbocharger positioned downstream of the exhaust manifold is increased thereby increasing the engine's efficiency and potential power output.

Figure 17:
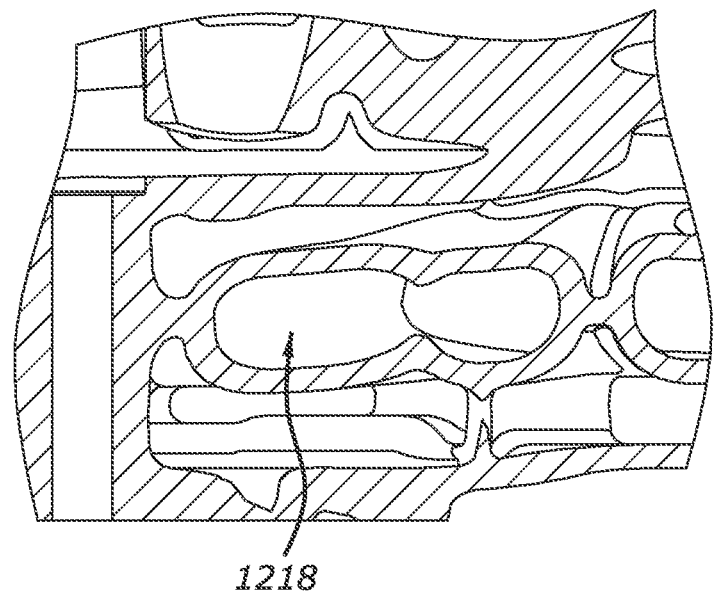
FIG. 17 shows a cross-sectional view a second inner exhaust runner included in the cylinder head shown in FIG. 3.

FIG. 17 shows a cross-sectional view of the second inner exhaust runner 1218 in a portion of the exhaust runner downstream of the valve guide entry points (1414 and 1416) in the direction of exhaust flow and upstream of confluence area 1244. The cross-sectional area of this portion may be less than the cross-sectional area of the exhaust runner downstream of the valve guide entry points in the direction of exhaust flow. Specifically, the cross-sectional area may be 660 mm$^2$. For reference the leading boundary, line 1316, and trailing boundary, line 1330, of the portion of the second inner exhaust runner discussed above is shown in FIG. 13. In this way, the cross-sectional area of the second inner exhaust runner along the length of the exhaust runner contracts. Due to the symmetry of the exhaust manifold it will be appreciated that the first inner exhaust runner is similar in geometry and size to the second inner exhaust runner.

The contraction in the first and second inner exhaust runners concentrates the exhaust gases in the center of the exhaust outlet 316, decreasing impingement of exhaust gases on the walls of the exhaust outlet 316. As such, the exhaust manifold losses can be decreased. Therefore, the energy delivered to the turbine via the exhaust gases may be increased when compared to other exhaust manifolds that do not have a contraction. In this way, the efficiency of the turbocharger and therefore the engine may be increased.

The cylinder head shown in FIGS. 2-17 provides for a cylinder head with an integrated exhaust manifold, the integrated exhaust manifold including an exhaust manifold flange. The cylinder head including a coolant inlet in communication with a cylinder head cooling system higher pressure passage, a coolant outlet in communication with a cylinder head cooling system lower pressure passage, and an exhaust flange coolant passage at least partially traversing the exhaust manifold flange and in communication with the coolant inlet and the coolant outlet. Further in some examples said exhaust flange coolant passage includes at least one of an exhaust manifold flange channel in the exhaust manifold flange and a channel in a second flange included in a downstream component. In some examples, the downstream component may be a turbocharger. The cylinder head may further include a sealing gasket interposed by the exhaust manifold flange and a second flange included in a downstream component. The sealing gasket may include an inner seal and an outer seal coupled to the exhaust manifold flange and the second flange and defining a boundary of the exhaust flange coolant passage. Additionally the inner and outer seals may be coupled via connectors. The inner and outer seals may be metal embossments. The coolant inlet and outlet may be coupled to coolant passages extending into the cylinder head. The cylinder head may further include a second exhaust flange coolant passage at least partially traversing the exhaust manifold flange including a second coolant inlet coupled to a second higher pressure region of the cylinder head cooling system and a second coolant outlet coupled to a second lower pressure region of the cylinder head cooling system. In some examples the cylinder head cooling system includes an upper and a lower cooling jacket and at least one crossover coolant passages coupling the upper cooling jacket to the lower cooling jacket. In some example the integrated exhaust manifold includes a plurality of exhaust runners each of the exhaust runners having a valve guide entry point and a confluence area, where at least one of a plurality of exhaust runners has a cross-sectional area which contracts between the valve guide entry point and the confluence area and at least one of the plurality of exhaust runner has a cross-sectional area which expands in a curved portion of the exhaust runner and which contracts at a straight portion of the exhaust runner.

Figure 18:
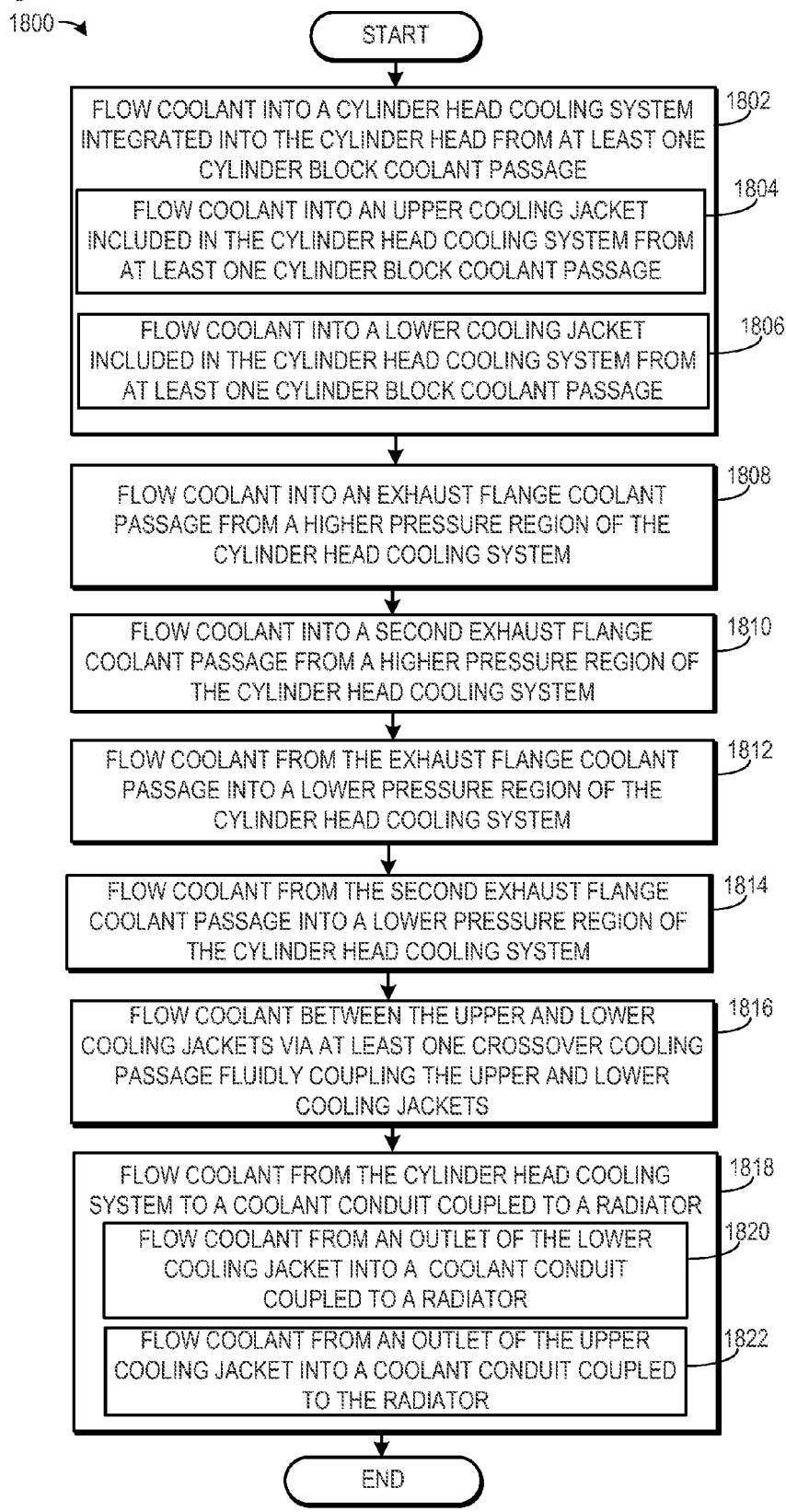
FIG. 18 shows a method for operation of a cylinder head cooling system in a cylinder head of an engine.

FIG. 18 shows a method 1800 for operation of a cylinder head cooling system in a cylinder head of an engine, the cylinder head having an integrated exhaust manifold. Method 1800 may be carried out by the systems and components described above. However, method 1800 may be implemented by other suitable systems and components in other embodiments.

First at 1802 the method includes flowing coolant into a cylinder head cooling system integrated into the cylinder head from at least one cylinder block coolant passage. As previously discussed, the cylinder head cooling system may include a plurality of integrated coolant passages and the cylinder block coupled to the cylinder head to form at least one combustion chamber.

In some examples flowing coolant into a cylinder head cooling system from at least one cylinder head coolant passage may include flowing coolant into an upper cooling jacket included in a cylinder head cooling system from at least one cylinder block coolant passage at 1804. Further in some examples, flowing coolant into a cylinder head cooling system from at least one cylinder head coolant passage may include flowing coolant into a lower cooling jacket included in the cylinder head cooling system from at least one cylinder block coolant passage at 1806.

Next at 1808, the method includes flowing coolant into an exhaust flange coolant passage from a higher pressure region of the cylinder head cooling system. As previously discussed, the exhaust flange coolant passage may be interposed between an exhaust manifold flange of an exhaust outlet of an exhaust manifold integrated into the cylinder head and a second flange included in a component downstream of the integrated exhaust manifold. In some examples, the flange coolant passage may circumvent the exhaust outlet. However in other examples, the flange coolant passage may only partially traverse the exhaust manifold flange. As previously discussed, the cylinder head may include a sealing gasket interposed by the exhaust manifold flange and the second flange, the sealing gasket including an inner seal and an outer seal coupled to the first flange and the second flange and defining a boundary of the flange coolant passage.

Next at 1810, the method may include flowing coolant into a second exhaust flange coolant passage from a higher pressure region of the cylinder head cooling system. However in other examples, step 1810 may not be included in method 1800. Next at 1812, the method includes flowing coolant from the exhaust flange coolant passage into a lower pressure region of the cylinder head cooling system.

At 1814, the method may include flowing coolant from the second exhaust flange coolant passage into a lower pressure region of the cylinder head cooling system. However in other examples, step 1814 may not be included in method 1800. Next at 1816, flowing coolant between the upper and lower cooling jackets via at least one crossover coolant passage fluidly coupling the upper and lower cooling jackets. It will be appreciated that in some embodiments step 1816 may be implemented after step 1802 and before step 1806.

Next at 1818, the method includes flowing coolant from the cylinder head cooling system to a coolant conduit coupled to a radiator. In some examples, flowing coolant from the cylinder head cooling system to a coolant conduit coupled to a radiator may include at 1820 flowing coolant from an outlet of the lower cooling jacket into a coolant conduit coupled to a radiator. Still further in some examples flowing coolant from the cylinder head cooling system to a coolant conduit coupled to a radiator may include at 1822 flowing coolant from an outlet of the upper cooling jacket into a coolant conduit coupled to the radiator.

Figure 19:
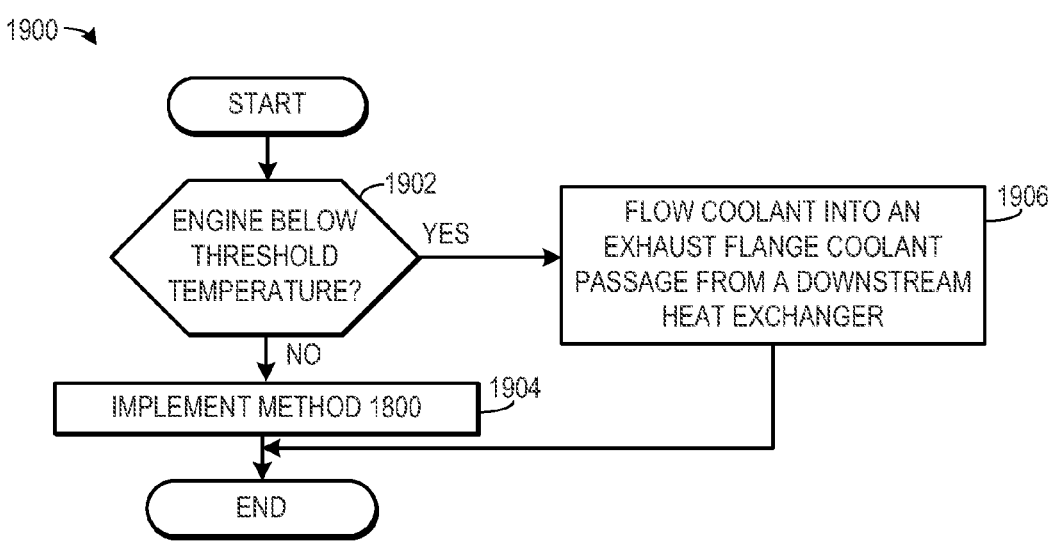
FIG. 19 shows a method for operation of a cylinder head cooling system in a cylinder head of an engine.

FIG. 19 shows a method 1900 for operation of a cylinder head cooling system in a cylinder head of an engine. Method 1900 may be carried out by the systems and components described above. However, method 1900 may be implemented by other suitable systems and components in other embodiments.

First at 1902, the method includes determining if the engine is below a threshold temperature. The threshold temperature may be calculated based on the material properties of the type of fuel used in the engine, the type of emission control system coupled to the engine, etc. If it is determined that the engine is not below a threshold temperature (NO at 1902), method 1900 proceeds to 1904 where method 1800 is implemented. After 1904 the method ends. However if it is determined that the engine is below a threshold temperature (YES at 1902), the method advances to 1906 where the method includes flowing coolant into an exhaust flange coolant passage from a downstream heat exchanger. In this way, coolant may be selectively flowed into the exhaust flange coolant passage from a downstream heat exchanger based on engine temperature. The downstream heat exchanger may be configured to recover exhaust heat from an exhaust system coupled to the exhaust manifold. As such, exhaust gas heat may be transferred from the exhaust gases to the exhaust flange during and engine cold start to reduce the amount of time to heat exhaust system components. The method may further include after step 1906 in some examples substantially inhibiting coolant flow from the cylinder block to the cylinder head. After 1906 the method ends. In this way, heat may be transferred to the exhaust flange coolant passage during a cold start, increasing the temperature of the exhaust system and thereby improving operation of an emission control system downstream of the exhaust manifold flange.

The systems and methods described herein enables the flange included in an exhaust manifold, decreasing the likelihood of thermal degradation of the exhaust manifold (e.g., flange), thereby increasing the longevity of the exhaust manifold. Furthermore, it will be appreciated that the exhaust flange coolant passage may be constructed via the modification of many existing parts in a cylinder head, decreasing size and cost of the cylinder head.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A cylinder head with an integrated exhaust manifold, the integrated exhaust manifold including an exhaust manifold flange, the cylinder head comprising:
  a coolant inlet in communication with a cylinder head cooling system higher pressure passage;
  a coolant outlet in communication with a cylinder head cooling system lower pressure passage;
  an exhaust flange coolant passage at least partially traversing the exhaust manifold flange and in communication with the coolant inlet and the coolant outlet; and
  a sealing gasket interposed by the exhaust manifold flange and a second flange included in a downstream component, wherein the sealing gasket includes an inner seal and an outer seal coupled to the exhaust manifold flange and the second flange and defining a boundary of the exhaust flange coolant passage.

2. The cylinder head of claim 1, wherein said exhaust flange coolant passage includes at least one of an exhaust manifold flange channel in the exhaust manifold flange and a channel in the second flange included in the downstream component.

3. The cylinder head of claim 2, wherein the downstream component is a turbocharger.

4. The cylinder head of claim 1, wherein the inner and outer seals are coupled via connectors.

5. The cylinder head of claim 1, wherein the inner and outer seals are metal embossments.

6. The cylinder head of claim 1, wherein the coolant inlet and outlet are coupled to coolant passages extending into the cylinder head.

7. The cylinder head of claim 1, further comprising a second exhaust flange coolant passage at least partially traversing the exhaust manifold flange including a second coolant inlet coupled to a second higher pressure region of the cylinder head cooling system and a second coolant outlet coupled to a second lower pressure region of the cylinder head cooling system.

8. The cylinder head of claim 1, wherein the cylinder head cooling system includes an upper and a lower cooling jacket and at least one crossover coolant passage coupling the upper cooling jacket to the lower cooling jacket.

9. A method for operation of a cylinder head cooling system in a cylinder head of an engine, the cylinder head including an integrated exhaust manifold, the method comprising:
flowing coolant into an exhaust flange coolant passage from a higher pressure region of the cylinder head cooling system, the exhaust flange coolant passage interposed between an exhaust manifold flange of an exhaust outlet of an exhaust manifold integrated into the cylinder head and a second flange included in a component downstream of the integrated exhaust manifold; and
flowing coolant from the exhaust flange coolant passage into a lower pressure region of the cylinder head cooling system, wherein the cylinder head includes a sealing gasket interposed by the exhaust manifold flange and the second flange, the sealing gasket including an inner seal and an outer seal coupled to the first flange and the second flange and defining a boundary of the exhaust flange coolant passage.

10. The method of claim 9, further comprising flowing coolant into the cylinder head cooling system integrated into the cylinder head from at least one cylinder block coolant passage prior to flowing coolant into the exhaust flange coolant passage, the cylinder head cooling system including a plurality of integrated coolant passages and the cylinder block coupled to the cylinder head to form at least one combustion chamber.

11. The method of claim 9, wherein flowing coolant into the cylinder head cooling system includes flowing coolant into an upper cooling jacket included in the cylinder head cooling system from at least one cylinder block coolant passage and flowing coolant into a lower cooling jacket included in the cylinder head cooling system from at least one cylinder block coolant passage.

12. The method of claim 11, further comprising flowing coolant between the upper and lower cooling jackets via at least one crossover coolant passage fluidly coupling the upper and lower cooling jackets.

13. The method of claim 9, further comprising flowing coolant into a second exhaust flange coolant passage from a higher pressure region of the cylinder head cooling system.

14. The method of claim 13, further comprising flowing coolant from the second exhaust flange coolant passage into a lower pressure region of the cylinder head cooling system.

15. The method of claim 9, wherein the exhaust flange coolant passage circumvents the exhaust outlet.

16. The method of claim 9, further comprising selectively flowing coolant into the exhaust flange coolant passage from a downstream heat exchanger based on engine temperature, the downstream heat exchanger configured to recover exhaust heat from an exhaust system coupled to the exhaust manifold.

17. A cylinder head with an integrated exhaust manifold, the integrated exhaust manifold including an exhaust manifold flange, the cylinder head comprising:
a coolant inlet in communication with a higher pressure passage in a cylinder head cooling system, the cylinder head cooling system configured to flow coolant through one or more coolant passages;
a coolant outlet in communication with a cylinder head cooling system lower pressure passage; and
an exhaust flange coolant passage at least partially traversing the exhaust manifold flange and in communication with the coolant inlet and the coolant outlet, the exhaust flange cooling passage interposed between the exhaust manifold flange and a flange of a downstream component, wherein the integrated exhaust manifold includes a plurality of exhaust runners, each of the exhaust runners having a valve guide entry point and a confluence area, where at least one of the plurality of exhaust runners has a cross-sectional area which contracts between the valve guide entry point and the confluence area and at least one of the plurality of exhaust runners has a cross-sectional area which expands in a curved portion of the exhaust runner and which contracts at a straight portion of the exhaust runner.

18. The cylinder head of claim 17, further comprising a sealing gasket interposed by the exhaust manifold flange and a second flange included in the downstream component, the sealing gasket including an inner seal and an outer seal coupled to the exhaust manifold flange and the second flange and defining a boundary of the exhaust flange coolant passage.

19. A system, comprising:
a cylinder head with an integrated exhaust manifold including a higher pressure passage inlet, a lower pressure passage outlet, and an exhaust manifold flange;
a turbocharger flange mated with the exhaust manifold flange; and
a coolant passage traversing around an entirety of an exhaust passage at the exhaust manifold flange, communicating with the coolant inlet and outlet, and interposed between the exhaust manifold flange and the turbocharger flange.

* * * * *